(12) United States Patent
Robinson

(10) Patent No.: US 12,214,642 B2
(45) Date of Patent: Feb. 4, 2025

(54) FLUID BUMP STOP SYSTEM FOR A MULTILINK SUSPENSION

(71) Applicant: JAGUAR LAND ROVER LIMITED, Coventry (GB)

(72) Inventor: Hugo Robinson, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 18/293,166

(22) PCT Filed: Jul. 27, 2022

(86) PCT No.: PCT/EP2022/071090
§ 371 (c)(1),
(2) Date: Jan. 29, 2024

(87) PCT Pub. No.: WO2023/006822
PCT Pub. Date: Feb. 2, 2023

(65) Prior Publication Data
US 2024/0253410 A1    Aug. 1, 2024

(30) Foreign Application Priority Data

Jul. 27, 2021  (GB) ..................................... 2110778

(51) Int. Cl.
*B60G 7/04* (2006.01)
*B60G 3/20* (2006.01)
(Continued)

(52) U.S. Cl.
CPC ................. *B60G 7/04* (2013.01); *B60G 3/20* (2013.01); *B62D 21/11* (2013.01);
(Continued)

(58) Field of Classification Search
CPC .................................. B62D 21/11; B60G 7/04
See application file for complete search history.

(56) References Cited

U.S. PATENT DOCUMENTS

| 5,437,354 A | 8/1995 | Smith |
| 5,467,970 A | 11/1995 | Ratu et al. |

(Continued)

FOREIGN PATENT DOCUMENTS

| CN | 102971162 A | * | 3/2013 | ............. B60G 11/56 |
| CN | 103660827 A | * | 3/2014 | |

(Continued)

OTHER PUBLICATIONS

Combined Search and Examination Report corresponding to application GB2110778.4, dated Dec. 10, 2021, 6 pages.

(Continued)

*Primary Examiner* — Nicole T Verley
(74) *Attorney, Agent, or Firm* — Reising Ethington P.C.

(57) ABSTRACT

Aspects of the present invention relate to a system (100) for a vehicle (1), the system comprising: fluid bump stop mounting brackets (200) each configured to receive a fluid bump stop (400); a rear subframe (300) for a multilink rear suspension arrangement of a vehicle (1) having a unibody chassis (10); and lower arms (308) of the multilink rear suspension arrangement of the vehicle; wherein the rear subframe extends laterally (y) and comprises an upper spring seat (302) at each lateral side of the rear subframe, wherein each upper spring seat is configured to receive an upper end of a spring (500), wherein the rear subframe comprises a central mounting space (304) for a drivetrain component (600), wherein the rear subframe further comprises one or more lower arm mounting points (306) at each lateral side of the rear subframe, for the lower arms, wherein each lower arm comprises a lower spring seat (322) configured to receive a lower end of the spring, wherein either the lower spring seats or the upper spring seats comprise the fluid bump stop mounting brackets, and wherein the other of the lower spring seats or the upper spring seats comprise (Continued)

bump stop landing pads (310) each configured to contact one of the fluid bump stops when suspension compression is above a threshold.

12 Claims, 3 Drawing Sheets

(51) Int. Cl.
  *B62D 21/11* (2006.01)
  *B60K 1/00* (2006.01)
  *B60K 17/16* (2006.01)
(52) U.S. Cl.
  CPC ............ *B60G 2204/15* (2013.01); *B60K 1/00* (2013.01); *B60K 17/16* (2013.01)

(56) References Cited

U.S. PATENT DOCUMENTS

| | | | | |
|---|---|---|---|---|
| 5,857,687 | A * | 1/1999 | Ishii | B60G 11/16 |
| | | | | 267/140 |
| 8,272,653 | B2 * | 9/2012 | Falkner | F16F 1/445 |
| | | | | 280/124.145 |
| 9,610,820 | B1 | 4/2017 | Chen | |
| 11,441,638 | B2 * | 9/2022 | Reynolds | B60G 7/04 |
| 2010/0133800 | A1 | 6/2010 | Buschjohann et al. | |
| 2010/0327548 | A1 * | 12/2010 | Falkner | F16F 1/445 |
| | | | | 280/124.1 |
| 2012/0187724 | A1 * | 7/2012 | Tomozawa | B62D 21/11 |
| | | | | 296/193.09 |
| 2013/0221648 | A1 * | 8/2013 | Kausch | B62D 21/11 |
| | | | | 280/788 |
| 2022/0221025 | A1 * | 7/2022 | Reynolds | B60G 7/04 |
| 2023/0150328 | A1 * | 5/2023 | Sosa | B60G 7/04 |
| | | | | 280/124.155 |

FOREIGN PATENT DOCUMENTS

| | | | | | |
|---|---|---|---|---|---|
| CN | 108202570 | A | | 6/2018 | |
| CN | 110001343 | A | * | 7/2019 | ........... B60G 15/067 |
| CN | 110091687 | A | * | 8/2019 | ............ B60G 15/02 |
| CN | 110626137 | A | * | 12/2019 | ........... B60G 15/062 |
| CN | 210760117 | U | * | 6/2020 | ............ B60G 15/02 |
| CN | 214057156 | U | * | 8/2021 | |
| CN | 113844224 | A | * | 12/2021 | |
| CN | 218287359 | U | * | 1/2023 | |
| CN | 116968488 | A | * | 10/2023 | |
| CN | 117301777 | A | * | 12/2023 | |
| DE | 102013007460 | A1 | * | 10/2014 | ........... B60K 5/1208 |
| DE | 102023107843 | A1 | * | 10/2023 | ........... B60G 13/003 |
| EP | 2177423 | A2 | | 4/2010 | |
| JP | H0722144 | U | * | 9/1993 | |
| JP | 2003237334 | A | | 8/2003 | |
| KR | 100378267 | B1 | | 8/2003 | |
| KR | 101326512 | B1 | * | 6/2013 | |
| KR | 1326512 | B1 | * | 11/2013 | ............... B60G 7/04 |
| KR | 20130068727 | A | * | 11/2013 | |
| KR | 20170068316 | A | * | 12/2015 | |
| KR | 2017068316 | A | * | 6/2017 | ............ B60G 7/001 |
| WO | WO-2012001933 | A1 | * | 1/2012 | ............ B60G 11/56 |
| WO | 2017168065 | A1 | | 10/2017 | |

OTHER PUBLICATIONS

International Search Report and Written Opinion corresponding to application PCT/EP2022/071090, dated Oct. 24, 2022, 13 pages.

* cited by examiner

FLUID BUMP STOP SYSTEM FOR A MULTILINK SUSPENSION

TECHNICAL FIELD

The present disclosure relates to a fluid bump stop system. In particular, but not exclusively it relates to a fluid bump stop system in a unibody chassis vehicle that has been adapted for off-road motorsports.

BACKGROUND

Vehicle suspension systems comprise bump stops. A solid rubber bump stop acts as a miniature shock absorber to cushion the impact force of the suspension system reaching the end of its compression travel.

Vehicles, particularly those used in off-road motorsports, may comprise fluid bump stops such as pneumatic or hydro-pneumatic or hydraulic bump stops. These absorb impacts far more effectively than solid rubber bump stops. The fluid bump stop may be secured by a mounting bracket to a longitudinal frame chassis member of the off-road motorsports vehicle.

SUMMARY OF THE INVENTION

It is an aim of the present invention to address one or more of the disadvantages associated with the prior art. It is not known for a vehicle having a monocoque chassis and multilink rear suspension system to accommodate fluid bump stops within rear suspension springs and to secure bump stops in the manner described herein. Aspects and embodiments of the invention provide a system and a vehicle as claimed in the appended claims.

According to an aspect of the invention there is provided a system for a vehicle, the system comprising:
fluid bump stop mounting brackets each configured to receive a fluid bump stop;
a rear subframe for a multilink rear suspension arrangement of a vehicle having a unibody chassis; and
lower arms of the multilink rear suspension arrangement of the vehicle;
wherein the rear subframe extends laterally and comprises an upper spring seat at each lateral side of the rear subframe,
wherein each upper spring seat is configured to receive an upper end of a spring,
wherein the rear subframe comprises a central mounting space for a drivetrain component,
wherein the rear subframe further comprises one or more lower arm mounting points at each lateral side of the rear subframe, for the lower arms,
wherein each lower arm comprises a lower spring seat configured to receive a lower end of the spring,
wherein either the lower spring seats or the upper spring seats comprise the fluid bump stop mounting brackets, and
wherein the other of the lower spring seats or the upper spring seats comprise bump stop landing pads each configured to contact one of the fluid bump stops when suspension compression is above a threshold.

An advantage of the system is that a fluid bump stop can be mounted within a spring and directly to a rear subframe which is a particularly strong part of the vehicle, and wherein the suspension geometry can remain optimal for both on-road and off-road use.

Optionally, each fluid bump stop mounting bracket comprises a fixing plate and a sleeve extending from the fixing plate, and wherein the sleeve is configured to receive the fluid bump stop.

Optionally, the sleeve is off-perpendicular relative to the fixing plate in a first plane by an angle having a value selected from the range more than approximately one degree and less than approximately five degrees, and wherein the sleeve is off-perpendicular relative to the fixing plate in a second orthogonal plane by an angle having a value selected from the range more than approximately one degree and less than approximately five degrees.

Optionally, the sleeve comprises one or more slits and clamping means extending across at least one of the slits, configured to compress the sleeve against sides of the fluid bump stop.

Optionally, the sleeve comprises an inner diameter having a value selected from the range at least approximately 52 mm and no more than approximately 65 mm.

Optionally, the sleeve is tubular and wherein an end edge of the tubular sleeve meets a surface of the fixing plate and is secured to the fixing plate.

Optionally, the fixing plate and the upper spring seat each comprise an opening to receive an end adjustment control of the fluid bump stop.

Optionally, each fluid bump stop mounting bracket comprises a plurality of gusset braces secured to the fixing plate and to an outer diameter of the sleeve.

Optionally, the drivetrain component is a rear differential or an electric traction motor.

Optionally, the rear subframe comprises a die-formed body extending between lateral sides of the vehicle.

Optionally, the rear subframe comprises a plurality of unibody chassis mounting points at each lateral side of the rear subframe.

According to a further aspect of the invention there is provided a vehicle comprising the system and unibody chassis, and a rollcage, wherein the unibody chassis comprises upper damper mounting points, and wherein the rollcage comprises mounting points each securable to an upper end of a rear damper and to one of the upper damper mounting points.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
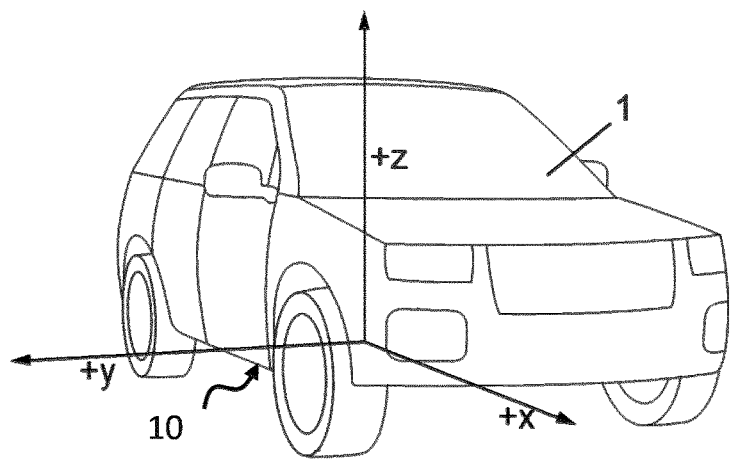
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. The vehicle 1 may be adapted from road use and functional off-road use to off-road motorsport use, as explained herein.

FIG. 1 is a front perspective view and illustrates a longitudinal x-axis between the front and rear of the vehicle 1 representing a centreline, an orthogonal lateral y-axis between left and right lateral sides of the vehicle 1, and a vertical z-axis. A forward direction typically faced by a driver's seat is in the positive x-direction; rearward is −x. A rightward direction as seen from the driver's seat is in the positive y-direction; leftward is −y. These are a first lateral direction and a second lateral direction.

The vehicle 1 has a unibody chassis 10, comprising an integrated body and frame. In automotive engineering, this is generally referred to as a monocoque/semi-monocoque chassis to the extent that large stamped panels of the vehicle 1 are made load-bearing, such as the floor pan and vehicle side and roof panels. By contrast, more traditional off-road race vehicles comprise a body-on-frame construction or spaceframe construction.

Figure 6:
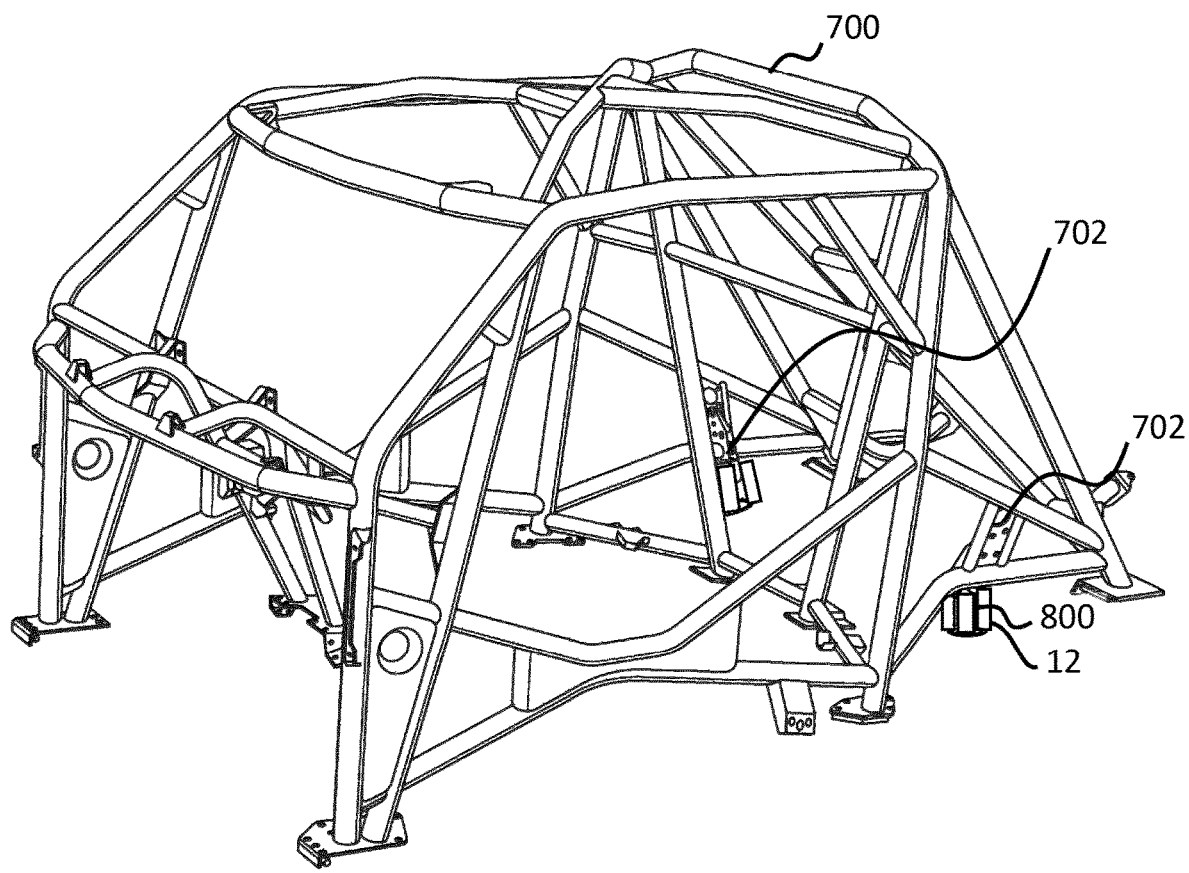
FIG. 6 illustrates an example of a rollcage and damper mounting points.

Further, as shown in FIG. 6, the vehicle 1 may be further stiffened and optimised for off-road racing with the addition of a rollcage 700. The rollcage 700 may be secured to the unibody chassis 10 and a suspension system at various locations around the vehicle 1.

The vehicle 1 may comprise a multilink rear suspension arrangement. The multilink rear suspension arrangement may comprise, for each rear wheel, a multilink rear suspension comprising three or more lateral arms and one or more longitudinal arms. A multilink rear suspension arrangement allows long articulation suitable for off-road racing, and allows engineers to alter one parameter at a time.

Figure 2:
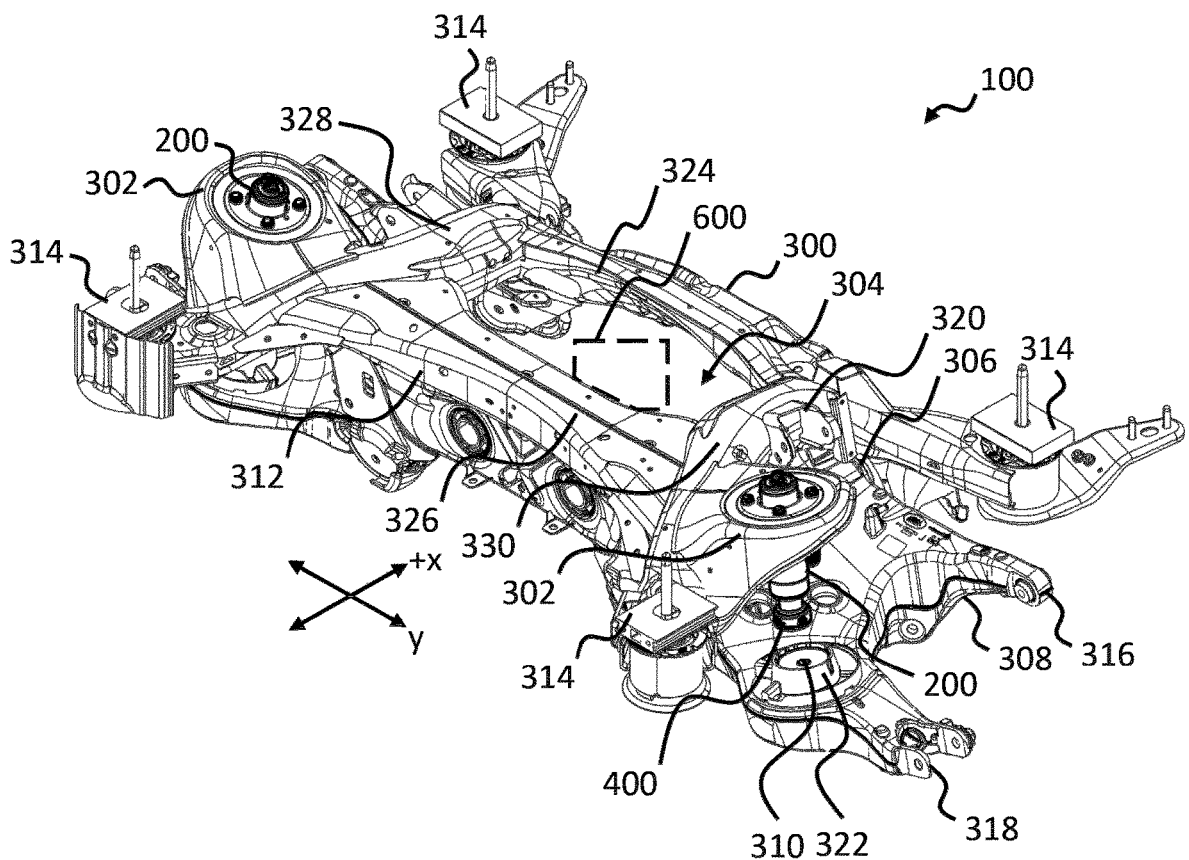
FIG. 2 illustrates an example of a system.

FIG. 2 illustrates a system 100 comprising a rear subframe 300 and a fluid bump stop arrangement. The rear subframe 300 is a rigid frame secured to the unibody chassis 10 and configured to attach a plurality of links of the multilink rear suspension arrangement to the vehicle 1.

The rear subframe 300 may extend laterally to the left and right sides of the vehicle 1, so that the suspensions of the left and right rear wheels may be secured to the same rear subframe 300.

The rear subframe 300 may comprise a body 312 of metal that has been shaped in a die into a complex geometry configured to extend to the left and right sides of the vehicle 1, such as by casting or stamping or forging. The rear subframe 300 may comprise a single body 312 or a plurality of such bodies joined to each other. The metal may comprise steel or aluminium.

The illustrated rear subframe 300 comprises various mounting points for the multilink rear suspension arrangement. The rear subframe 300 comprises one or more lower arm mounting points 306 at each lateral side of the vehicle 1, to enable a lower arm 308 of the multilink rear suspension arrangement to be hingeably mounted to the rear subframe 300 at each side. The lower arm 308 may be forked and may comprise connectors 316, 318 to respectively be secured to the front and rear of a hub carrier (not shown), therefore, the lower arm 308 functions as more than one suspension link. The rear subframe 300 can comprise further multilink suspension mounting points 320. A sway bar may be present but is not shown.

Figure 5:
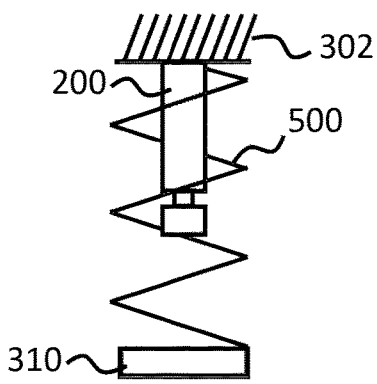
FIG. 5 schematically illustrates an example of a spring and a fluid bump stop.

The rear subframe 300 further comprises an upper spring seat 302 at each lateral side of the rear subframe 300. The illustrated upper spring seat 302 faces downwards and slightly outboard and is configured to receive an upper end of a spring, an example of which is schematically illustrated in FIG. 5. The spring 500 may be a coil spring. The upper spring seat 302 is therefore part of the rear subframe 300 rather than part of the unibody chassis 10.

The illustrated rear subframe 300 comprises a central mounting space 304 for a drivetrain component 600, such as a rear differential or an electric traction motor. The drivetrain component 600 may be secured to the rear subframe 300. The rear subframe 300 may wrap around the drivetrain component 600 in the x-y plane. For example, the rear subframe 300 may comprise a front cross member 324 and a rear cross member 326, each extending laterally. The front cross member 324 and rear cross member 326 may be interconnected by a first side member 328 at the left side of the rear subframe 300 and by a second side member 330 at the right side of the rear subframe 300. A central space between the front cross member 324, rear cross member 326, first side member 328 and second side member 330 may be the central mounting space 304.

A combination of two or more members may optionally be a unitary part formed in a same die, such as any two or more of: at least part of the front cross member 324; at least part of the rear cross member 326; at least part of the first side member 328; and at least part of the second side member 330.

The illustrated rear subframe 300 further comprises unibody chassis mounting points 314 configured to enable the rear subframe 300 to be mounted to the unibody chassis 10. FIG. 2 illustrates two unibody chassis mounting points 314 at each lateral side of the rear subframe 300. The unibody chassis mounting points 314 may be located approximately at each corner, e.g., each of four corners, of the rear subframe 300.

Referring again to the lower arm 308, the hinged motion of the lower arm 308 is resisted by the spring 500. The illustrated lower arm 308 comprises a lower spring seat 322 configured to receive the spring 500. The lower spring seat 322 faces the upper spring seat 302 of the rear subframe 300.

A rear damper 800 (FIG. 6, not shown in FIG. 2) may be secured to the hub carrier (not shown), also known as a suspension knuckle. The hub carrier is supported by suspension components including the lower arm 308 In other examples, the rear damper 800 is directly secured to the lower arm 308. The damper 800 may extend upwardly and may be mounted to the unibody chassis 10 and to a rollcage 700, as shown in FIG. 6.

In the illustrated system 100, the lower spring seat 322 and spring 500 are located inboard of the rear damper 800. An advantage is that the spring 500 does not have to be long to enable a long range of articulation. The separation of the spring 500 from the rear damper 800 also enables other variants of the same vehicle 1 to comprise air suspension.

FIG. 2 further illustrates a fluid bump stop 400 mounted to a spring seat, which is the upper spring seat 302 in the illustrated example. The opposite spring seat 322 comprises a bump stop landing pad 310 configured to contact a fluid bump stop 400 when suspension compression is above a threshold at or near the end of full travel.

Figure 3:
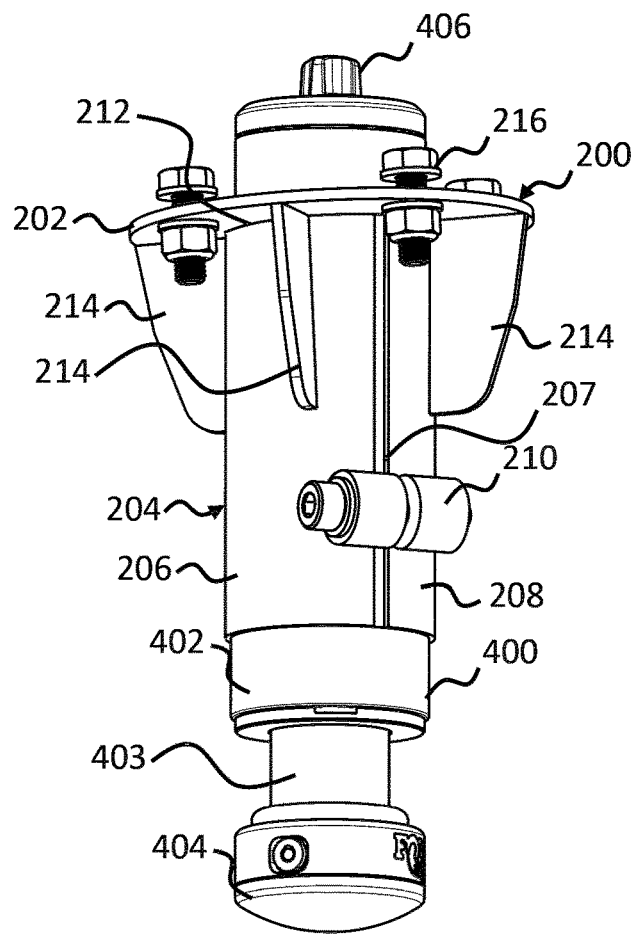
FIG. 3 illustrates an example of a fluid bump stop mounting bracket.
Figure 4:
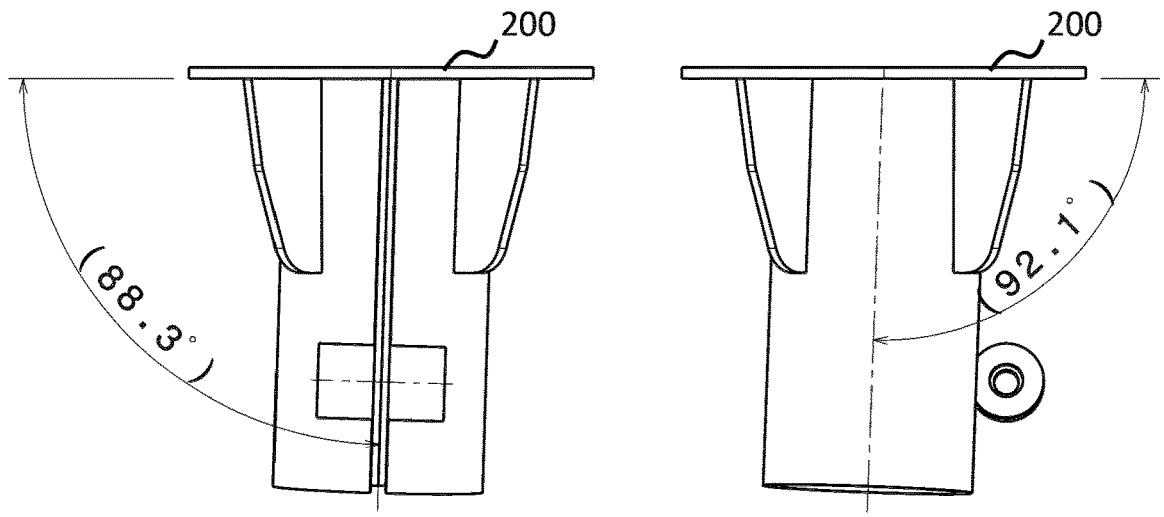
FIG. 4 illustrates an example of a geometry of a fluid bump stop mounting bracket.

FIGS. 3-4 illustrate a fluid bump stop mounting bracket 200 and fluid bump stop 400 in more detail.

The fluid bump stop 400 comprises a main body 402 that fits into the sleeve 204, and a shaft 403 comprising a bump stop pad 404 at its end. The shaft 403 retracts axially into the main body 402 in the event that the bump stop pad 404 and the bump stop landing pad 310 impact each other. The fluid bump stop 400 is coaxial with the spring 500, as shown in FIG. 5.

The fluid bump stop mounting bracket 200 comprises a fixing plate 202 configured to be detachably secured to the spring seat 302. The fixing plate 202 may be detachably secured to the upper spring seat 302 by a plurality of bolts 216, for example. The fixing plate 202 may be flat or substantially flat. The fixing plate 202 may comprise a metal.

The fluid bump stop mounting bracket 200 further comprises a sleeve 204 (collar) extending from the fixing plate 202, wherein the sleeve 204 is configured to receive a fluid bump stop 400. A central axis of the sleeve 204 may intersect the fixing plate 202. In use, the sleeve 204 extends downwards and slightly outboard, towards the bump stop landing pad 310.

The sleeve 204 may be tubular in cross-section, as well as the fluid bump stop 400. The sleeve 204 may comprise an inner diameter having a value selected from the range at least approximately 52 mm (for a 2 inch bump stop diameter) and no more than approximately 65 mm (for a 2.5 inch bump stop diameter).

The fluid bump stop 400 may be held in place by friction. The illustrated sleeve 204 comprises a plurality of sleeve sections 206, 208, such as two half-cylinders. The sleeve sections 206, 208 are separated from each other by slits 207, of which one is visible—the other is on the opposite side of the sleeve 204. The slits 207 extend away from the fixing plate 202. The sleeve 204 further comprises clamping means 210 (a clamp) extending across at least one of the slits 207. The clamping means 210 is connected to one of the sleeve sections 206 at one side of the slit 207 and to another one of the sleeve sections 208 at the other side of the slit 207. The clamping means 210 is configured to bias the sleeve sections 206, 208 towards each other and therefore against sides of the fluid bump stop 400. The clamping means 210 may be tightened via a screw, for example.

According to FIG. 3, a generally circular end edge 212 of the tubular sleeve 204 meets a front surface of the fixing plate 202 and is secured to the fixing plate 202, for example by welding.

The illustrated fluid bump stop mounting bracket 200 further comprises sleeve reinforcement such as a plurality of gusset braces 214 secured to the fixing plate 202 and to an outer diameter of the sleeve 204. Four are shown, at approximately equal angular spacings. The gusset braces 214 comprise plates that extend generally radially away from the sleeve 204. One edge of each gusset brace 214 is secured (e.g., welded) to the outer diameter of the sleeve 204, and an adjacent edge of each gusset brace 214 is secured (e.g., welded) to the fixing plate 202. The gusset braces 214 may be fin-shaped.

The fixing plate 202 may comprise a central opening having the inner diameter of the sleeve 204, to enable pass-through of an upper end of the fluid bump stop 400. An end adjustment control 406 of the fluid bump stop 400 may be passed through the central opening of the fixing plate 202 and accessible from the rear side of the fixing plate 202. The end adjustment control 406 may enable control of fluid pressure in the fluid bump stop 400, for example. In a non-limiting example implementation of the fluid bump stop 400, the fluid bump stop 400 is hydraulic but with nitrogen gas utilised to reduce cavitation in the hydraulic fluid. As shown in FIG. 2, the upper spring seat 302 of the rear subframe 300 may comprise a corresponding opening so that the end adjustment control 406 is accessible from above the rear subframe 300 behind the upper spring seat 302, without needing to detach the fluid bump stop 400 from the fluid bump stop mounting bracket 200 or from the rear subframe 300.

FIG. 4 illustrates that the sleeve 204 may be slightly off-perpendicular to the fixing plate 202, in order to better align the fluid bump stop 400 with the bump stop landing pad 310. Good alignment minimises lateral loads on the fluid bump stop 400. The sleeve 204 may be off-perpendicular in one plane or in two orthogonal planes.

The sleeve 204 can be off-perpendicular relative to the fixing plate 202 in a first plane by an angle having a value selected from the range more than approximately one degree and less than approximately five degrees, and the sleeve 204 may be off-perpendicular relative to the fixing plate 202 in a second plane, orthogonal to the first plane, by an angle having a value selected from the range more than approximately one degree and less than approximately five degrees.

In the illustrated example, the sleeve 204 is off-perpendicular by approximately 1.7 degrees and approximately 2.1 degrees, in the respective planes.

FIG. 6 illustrates an example rollcage 700 and how it may be secured to the unibody chassis 10 at the rear of the vehicle 1. FIG. 6 illustrates a rollcage 700 of space frame design (tubular welded frames).

The rollcage 700, in this example, is dimensioned according to the unibody chassis 10 of a vehicle 1. For example, the roll cage can be dimensioned to facilitate installation within a cabin of the vehicle 1, within the envelope of the unibody chassis 10, substantially spanning this space.

The rollcage 700 comprises mounting points 702 for securing the rear of the rollcage 700 to the unibody chassis 10. The mounting points 702 may comprise clevises or similar. FIG. 6 also schematically illustrates the tops of rear dampers 800, extending up through strut turrets in the unibody chassis 10 of the vehicle 1. FIG. 6 further schematically illustrates upper damper mounting points 12 secured to the unibody chassis 10. A clevis pin may be inserted through the top of a rear damper 800, an upper damper mounting point 12 of the unibody chassis 10, and the clevis 702 of the rollcage 700, to secure the rear damper 800, unibody chassis 10 and rollcage 700 together. This provides a very rigid damper connection.

It will be appreciated that various changes and modifications can be made to the present invention without departing from the scope of the present application. Although embodiments of the present invention have been described in the preceding paragraphs with reference to various examples, it should be appreciated that modifications to the examples given can be made without departing from the scope of the invention as claimed. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A system for a vehicle, the system comprising:
   fluid bump stop mounting brackets each configured to receive a fluid bump stop;
   a rear subframe for a multilink rear suspension arrangement of a vehicle having a unibody chassis; and
   lower arms of the multilink rear suspension arrangement of the vehicle;
   wherein the rear subframe extends laterally and comprises an upper spring seat at each lateral side of the rear subframe,
   wherein each upper spring seat is configured to receive an upper end of a spring,
   wherein the rear subframe comprises a central mounting space for a drivetrain component,
   wherein the rear subframe further comprises one or more lower arm mounting points at each lateral side of the rear subframe, for the lower arms,
   wherein each lower arm comprises a lower spring seat configured to receive a lower end of the spring,
   wherein either the lower spring seats or the upper spring seats comprise the fluid bump stop mounting brackets, and
   wherein the other of the lower spring seats or the upper spring seats comprise bump stop landing pads each configured to contact one of the fluid bump stops when suspension compression is above a threshold.

2. The system of claim 1, wherein each fluid bump stop mounting bracket comprises a fixing plate and a sleeve extending from the fixing plate, and wherein the sleeve is configured to receive the fluid bump stop.

3. The system of claim 2, wherein the sleeve is off-perpendicular relative to the fixing plate in a first plane by an angle having a value selected from the range more than approximately one degree and less than approximately five degrees, and wherein the sleeve is off-perpendicular relative to the fixing plate in a second orthogonal plane by an angle having a value selected from the range more than approximately one degree and less than approximately five degrees.

4. The system of claim 2, wherein the sleeve comprises one or more slits and clamping means extending across at least one of the slits, configured to compress the sleeve against sides of the fluid bump stop.

5. The system of claim 2, wherein the sleeve comprises an inner diameter having a value selected from the range at least approximately 52 mm and no more than approximately 65 mm.

6. The system of claim 2, wherein the sleeve is tubular and wherein an end edge of the tubular sleeve meets a surface of the fixing plate and is secured to the fixing plate.

7. The system of claim 2, wherein the fixing plate and the upper spring seat each comprise an opening to receive an end adjustment control of the fluid bump stop.

8. The system of claim 2, wherein each fluid bump stop mounting bracket comprises a plurality of gusset braces secured to the fixing plate and to an outer diameter of the sleeve.

9. The system of claim 1, wherein the drivetrain component is a rear differential or an electric traction motor.

10. The system of claim 1, wherein the rear subframe comprises a die-formed body extending between lateral sides of the vehicle.

11. The system of claim 1, wherein the rear subframe comprises a plurality of unibody chassis mounting points at each lateral side of the rear subframe.

12. A vehicle comprising the system and unibody chassis of claim 1, and a rollcage, wherein the unibody chassis comprises upper damper mounting points, and wherein the rollcage comprises mounting points each securable to an upper end of a rear damper and to one of the upper damper mounting points.

* * * * *